United States Patent [19]

Karlsson

[11] 4,017,231

[45] Apr. 12, 1977

[54] DEVICE ON APPARATUS FOR PRESSING POWDER OR GRANULES INTO CANDLES

[76] Inventor: Hugo Karlsson, Kopmansgatan 17, S-820 60 Delsbo, Sweden

[22] Filed: Mar. 7, 1975

[21] Appl. No.: 556,342

[30] Foreign Application Priority Data

Mar. 8, 1974 Sweden .............................. 7403091

[52] U.S. Cl. .................................. 425/110; 425/803

[51] Int. Cl.$^{2}$ ...................... B29D 31/00; B29C 3/00

[58] Field of Search ........... 425/801, 802, 803, 110

[56] References Cited

UNITED STATES PATENTS 3,702,495 11/1972 Renoe ........................... 425/803 X

FOREIGN PATENTS OR APPLICATIONS 61,896 4/1892 Germany ........................... 425/803

*Primary Examiner*—Robert L. Spicer, Jr.
*Attorney, Agent, or Firm*—Birch, Stewart, Kolasch and Birch

[57] ABSTRACT

In an apparatus for pressing paraffin granules or paraffin powder into candles wherein a candle which tube containing a candle wick is concentrically disposed within a candle-making tubular chamber, said tubular chamber also housing a piston which is slidably disposed therein and adapted to compress the paraffin granules or paraffin powder into a candle, the improvement which comprises providing a recess in the end face of the piston for receiving and centering the end of the wick tube containing said candle wick in said tubular chamber to ensure that the wick is centered in the tubular chamber and subsequently in the candle from one end to the other end thereof.

3 Claims, 3 Drawing Figures

DEVICE ON APPARATUS FOR PRESSING POWDER OR GRANULES INTO CANDLES

The object of the present invention is a device on apparatus for compressing powder or granules of e.g. paraffin into candles, whereby the candlewick is conveyed through a wick tube to the end face of a pressing piston intended for the compression of paraffin powder etc. and moving within a tubular chamber.

In the mechanical production of candles by the process of exposing the paraffin granules or powder etc. to pressure, some machines of known type employ a wick tube through which the wick is conveyed prior to compression of the powder see, for example German Offenlegungsschrift 2,202,784, published on Aug. 9, 1973, the subject matter of which is incorporated into the present application by reference. The wick tube can move in an axial direction to the extent provided for by the method of production. The tube is centered at one end, e.g. by means of one or more bushes, but has no centering device at the other end, which is turned towards the pressing piston. Consequently, there is no exact alignment to the wick tube. As poor alignment of the tube can cause the apparatus to malfunction, it has proved necessary to center the end of the tube facing towards the pressing piston, as well. This problem of centering has been solved by the device provided for in the invention, the characteristics of which are presented in the accompanying claims.

One embodiment of the invention is described by way of example with reference to the drawings in which.

Figure 3:
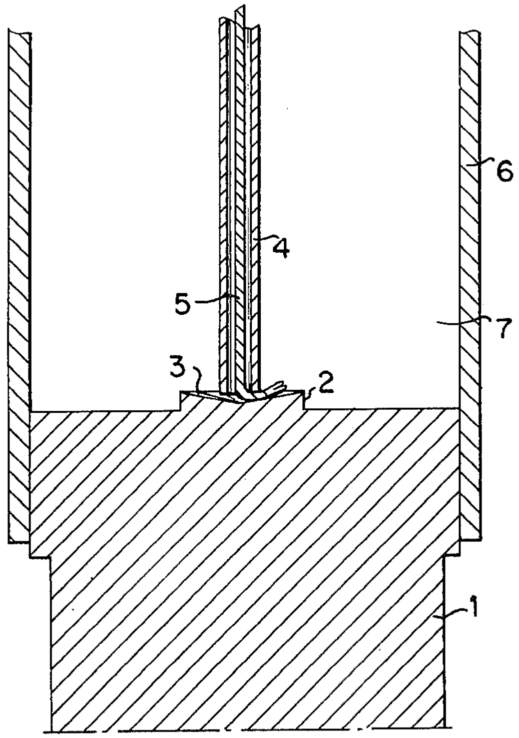
FIG. 3 shows the wick and wick tube and the piston disposed within a cylindrical shell.
Figure 1:
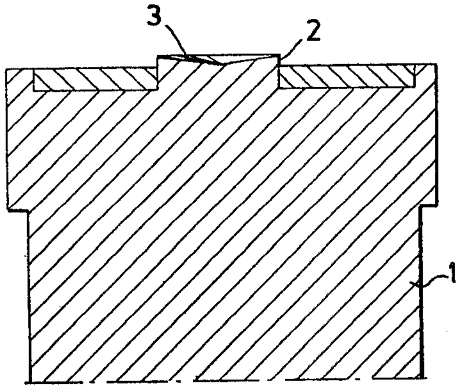
FIG. 1 shows a longitudinal section of a pressing piston.
Figure 2:
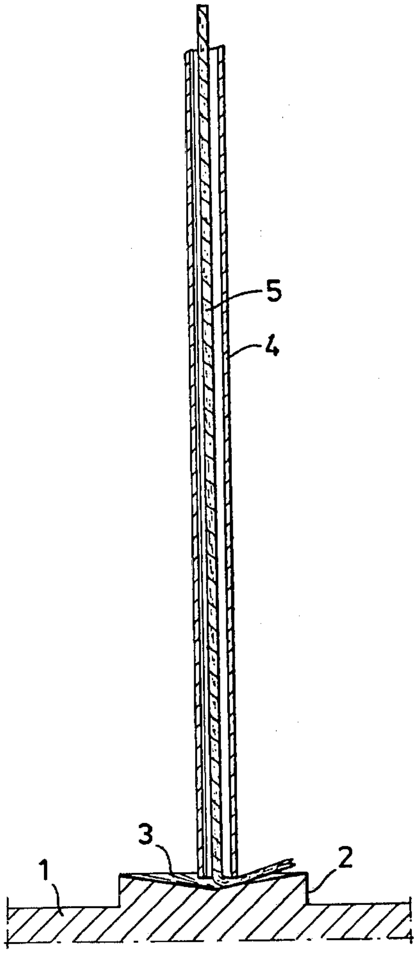
FIG. 2 illustrates how the wick tube with the inserted wick bears against the center of the pressing piston.

Referring to the drawings the pressing piston 1 is provided with a concentrically fitted pin 2. In the center of this is a recess 1, which in the example indicated is conical. As one end of the wick tube 4 makes contact with the pressing piston 1, it is automatically guided towards the center of the recess thereby correctly positioning the wick 5 for pressing into place. The invention, of course, is not restricted to the embodiment discribed, but variations can be made within the scope of the invention as claimed with respect, for example, to the shape of the recess. The recess need not be placed in a pin and the pin need not be concentrically fitted in the pressing piston. Also the end face of the piston can be designed differently.

FIG. 3 shows the wick 5, the wick tube 4, and the pressing piston 1 disposed within a cylindrical shell 3 of an apparatus for pressing granules of powder of parrafin into candles as defined by the present invention. Loose candle material is introduced through a feeding system into the chamber 7 defined by the cylindrical shell 3 and the loose candle material is compacted in chamber 7 by the upward motion of the pressing piston 1. As is readily apparent, the wick tube 4 moves in the upward direction simultaneously with the upward movement of the pressing piston. It is readily apparent that the recess 3 provided in the end face of the pressing piston 1 is very effective in centering the wick 5 in the cylindrical shell 6, and ultimately within the candle itself.

I claim:

1. In an apparatus for pressing paraffin granules or paraffin powder into candles wherein a candle wick tube containing a candle wick is concentrically disposed within a candle-making tubular chamber, said tubular chamber also housing a piston which is slidably disposed therein and adapted to compress the paraffin granules or paraffin powder into a candle, the improvement which comprises providing a recess in the end face of the piston for receiving and centering the end of the wick tube in said tubular chamber to ensure that the wick is centered in the tubular chamber and subsequently in the candle from one end to the other end thereof.

2. The apparatus of claim 1, wherein the end face of the piston is provided with a concentric pin, said recess being disposed in said pin.

3. The apparatus of claim 2, wherein the recess has a conical shape.

* * * * *